US012803980B2

(12) United States Patent
Wang et al.

(10) Patent No.: US 12,803,980 B2
(45) Date of Patent: Nov. 17, 2026

(54) INTELLIGENT SERVICE SYSTEM AND METHOD, ELECTRONIC DEVICE, AND STORAGE MEDIUM

(71) Applicant: New H3C Security Technologies Co., Ltd., Hefei (CN)

(72) Inventors: Jian Wang, Beijing (CN); Qiyong Wang, Beijing (CN); Zhiqiang Fu, Beijing (CN)

(73) Assignee: New H3C Security Technologies Co., Ltd., Hefei (CN)

( * ) Notice: Subject to any disclaimer, the term of this patent is extended or adjusted under 35 U.S.C. 154(b) by 29 days.

(21) Appl. No.: 18/822,033

(22) Filed: Aug. 30, 2024

(65) Prior Publication Data

US 2025/0106210 A1 Mar. 27, 2025

(30) Foreign Application Priority Data

Sep. 27, 2023 (CN) ........................ 202311270782.6

(51) Int. Cl.
*H04L 9/40* (2022.01)
*H04L 67/141* (2022.01)

(52) U.S. Cl.
CPC ........ *H04L 63/0884* (2013.01); *H04L 67/141* (2013.01)

(58) Field of Classification Search
CPC ............... H04L 63/0884; H04L 67/141; H04L 63/0407; H04L 63/0281; H04L 67/56; H04L 9/40; H04L 63/08
See application file for complete search history.

(56) References Cited

U.S. PATENT DOCUMENTS

2022/0060390 A1* 2/2022 Li ........................... H04L 67/51
2023/0376947 A1* 11/2023 Chayanam .............. H04L 63/08
2025/0007908 A1* 1/2025 Diu ..................... H04L 63/0281

FOREIGN PATENT DOCUMENTS

CN 111400071 A 7/2020
CN 115080714 A 9/2022
CN 116633688 A 8/2023
EP 0855659 A1 7/1998

OTHER PUBLICATIONS

Extended European Search Report for EP 24197358.5 by European Patent Office dated Feb. 5, 2025.
Office Action for CN 202311270782.6 by China National Intellectual Property Administration dated May 29, 2026.

* cited by examiner

*Primary Examiner* — Amie C. Lin
(74) *Attorney, Agent, or Firm* — BROADVIEW IP LAW, PC

(57) ABSTRACT

An intelligent service system includes: a proxy server, where the proxy server has a user session channel established between the proxy server and a user requesting a service, and assigns a session identifier to the user session channel; and the proxy server has one or more service session channel established between the proxy server and an external AI server; the proxy server is to receive a service request from the user through the session channel; and in the event that the user authentication passes, the session identifier corresponding to the user and the request content in the service request are sent to the AI server through any of the one or more service session channel.

16 Claims, 5 Drawing Sheets

INTELLIGENT SERVICE SYSTEM AND METHOD, ELECTRONIC DEVICE, AND STORAGE MEDIUM

CROSS REFERENCE TO RELATED APPLICATIONS

This application claims priority to Chinese Patent Application No. 202311270782.6 filed on Sep. 27, 2023, the entire contents of which is incorporated herein by reference.

FIELD

The present disclosure relates to the field of information security technology, and more specifically, the present disclosure relates to an intelligent service system and method, an electronic device, and a storage medium.

BACKGROUND

With the emergence of artificial intelligence (AI) foundation models, generative AI is leading a new generation of AI transformation. Generative AI service providers collect users' conversational data to enable real-time data acquisition for large-scale application scenarios, facilitating rapid iteration and optimization of foundation model parameters.

As generative AI service providers collect more and more users' conversational data, they can analyze and extract users' personalities, occupations, emotions, event opinions, and tendencies based on the collected data, leading to potential user privacy leaks. Therefore, protecting user privacy data during the use of AI foundation models has become a technical issue that needs to be addressed.

SUMMARY

System, method, electronic device, and storage medium are described herein that provide intelligent service processing through proxy server. For example, an intelligent service system sends a session identifier and request content to an AI server through a proxy server, so that the AI server is unable to obtain the user's identity information, and obfuscates and transmits the request content of different users in service session channels, so that the AI server is unable to analyze the user's private data based on data received, improving the security of the user's privacy.

A first aspect of the present disclosure provides an intelligent service system, the system comprising: a proxy server;

the proxy server has a user session channel established between the proxy server and a user requesting a service, and assigns a session identifier to the user session channel; and the proxy server having one or more service session channel established between the proxy server and an external AI server;

the proxy server is to receive a service request from the user through the session channel; and in the event that a user authentication passes, the session identifier corresponding to the user and a request content in the service request are sent to the AI server through any of the one or more service session channel.

A second aspect of the present disclosure provides an intelligent service method, applied to a proxy server, the method comprising:

establishing a user session channel with a user, and assigning a session identifier to the user session channel;

receiving a service request from the user through the user session channel;

sending the session identifier and request content in the service request to the AI server via one of the service session channels with the AI server in the event that a user authentication is determined to have passed.

A third aspect of the present disclosure provides an electronic device comprising a memory, a processor and a computer program stored on the memory and runnable on the processor, the processor running the computer program to implement a method as described in the second aspect of the present disclosure.

A fourth aspect of the present disclosure provides a non-transitory computer-readable storage medium having a computer program stored thereon, the computer program being executed by the processor to realize the steps of the method as described in the second aspect of the present disclosure.

Beneficial effects of the present disclosure include at least:

In an example of the present disclosure, only the session identifier and the request content are sent to the AI server through the proxy server without sending the identity information of the user, such that the AI server cannot determine to which user the request content belongs. Moreover, the proxy server transmits the session identifier and the corresponding request content to the AI server through any service session channel, so that even if a service session channel transmits data of the same user, the AI server is unable to associate the received data with the user's identity, and thus is unable to obtain the user's private information. The request contents of different users can also be transmitted through one service session channel, so that the data received by the AI server through the service session channel is confused with the data of different users, the received data will be more dispersed in terms of content, it is difficult to extract user data with prominent features from it, and it is also impossible to associate the received data with the user identity, further improving the security of the user's privacy.

BRIEF DESCRIPTION OF THE DRAWINGS

The accompanying drawings, which form part of the specification, depict embodiments of the present disclosure and, together with the description, are used to explain the principles of the present disclosure.

With reference to the accompanying drawings, the present disclosure may be more clearly understood in the light of the following detailed description, in which.

DETAILED DESCRIPTION

Figure 1:
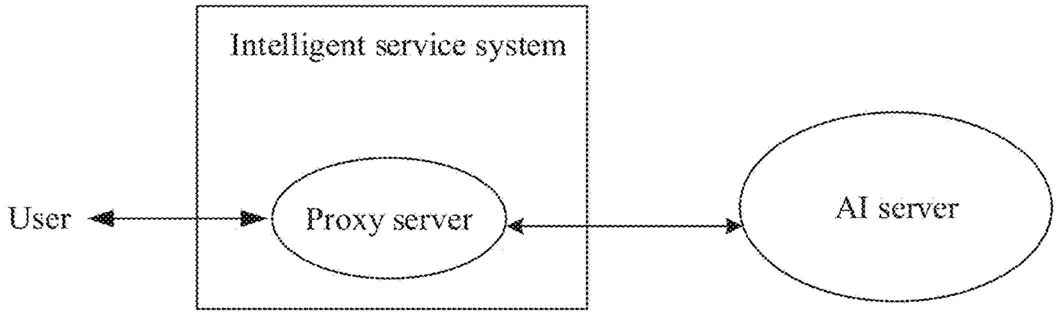
FIG. 1 shows a structural diagram of an intelligent service system provided in an example of the present disclosure.

In the following, embodiments of the present disclosure will be described with reference to the accompanying drawings. It should be understood, however, that these descriptions are merely exemplary and are not intended to limit the scope of the present disclosure. Furthermore, in the following description, descriptions of well-known structures and techniques are omitted to avoid unnecessarily confusing the concepts of the present disclosure. It will be apparent to those skilled in the art that the present disclosure can be implemented without one or more of these details. In other examples, some technical features that are well known in the art are not described in order to avoid confusion with the present disclosure.

It should be noted that the terminology used herein is intended only to describe specific embodiments and is not intended to limit the exemplary embodiments based on the present disclosure. As used herein, the singular form is also intended to include the plural form unless the context otherwise clearly indicates. In addition, it should be understood that when the terms "comprising" and/or "including" are used in this specification, they indicate the presence of the described features, integrals, steps, operations, elements and/or components, but do not exclude the presence of, or the addition of, one or more other features, integral, steps, operations, elements, components and/or combinations thereof.

Exemplary embodiments according to the present disclosure will now be described in more detail with reference to the accompanying drawings. However, these exemplary embodiments may be implemented in a number of different forms and should not be construed as being limited to the embodiments set forth herein. The accompanying drawings are not to scale, in which certain details may have been enlarged and certain details may have been omitted for purposes of clarity of expression. The shapes of the various regions and layers shown in the drawings, as well as the relative sizes and positional relationships among them, are only exemplary, and may be deviated from in practice due to manufacturing tolerances or technical limitations, and a person skilled in the art may additionally design regions/layers having different shapes, sizes, and relative positions, as practically required.

Exemplary embodiments according to the present disclosure are described below. It is to be noted that the following embodiments are shown only for the purpose of facilitating the understanding of the spirit and principles of the present disclosure, and the embodiments of the present disclosure are not limited in any way in this respect. Rather, the embodiments of the present disclosure may be applied to any scenario to which they are applicable.

Generative AI is an artificial intelligence technique that enables the creation of new content similar to the original data by learning from large amounts of data. A number of products have emerged that provide generative AI services, which can be used by users to generate the information they need. For example, using generative AI services to generate essays, job summaries, student compositions, etc. Before users use generative AI services to generate the information they need, they need to provide the generative AI services with their own demand information, which includes the user's personal information as well as some descriptive information about the information they need.

For example, assuming that the user needs a language essay for a 4th grade elementary school student, the user needs to send his or her personal information, such as account number or IP address, and the description of the problem, such as "4th grade language essay on describing a spring trip" to the generative AI server. The generative AI server automatically generates a language essay on spring trip that meets the knowledge level of a 4th grade student and returns the language essay to the user based on the user's personal information such as account number or IP address.

Generative AI services have brought great convenience to people's life, study and work. At the same time, it also brings some new problems to people, among which the possible leakage of user privacy is an important issue. Because in the process of using generative AI services, generative AI services are able to collect users' personal information, and by continuously collecting information such as descriptions of problems raised by users in the process of using them, generative AI service providers are able to analyze the user's privacy data such as his or her personality, occupation, feelings, views on events, and tendencies based on the obtained user data, and carve out a user portrait, thus making the user privacy leaked. Therefore, how to protect user privacy has become a technical issue of concern in the process of using generative AI services.

Based on this, embodiments of the present disclosure provide an intelligent service system, as shown in FIG. 1, which includes: a proxy server.

The proxy server is communicatively connected to an external AI server, and the proxy server is also used to be communicatively connected to a terminal of a user. The proxy server and the AI server may be two different hardware devices, or two sets of server clusters. Alternatively, it may be a different service program deployed on the same hardware device.

In the embodiments of this disclosure, one or more service session channel is established between the proxy server and the external AI server. A user session channel is established between the proxy server and the user requesting a service, and a session identifier is assigned to the user session channel. The proxy server is used to receive service requests from users through the user session channel; in response to a determination that the user authentication is successful, the proxy server sends the session identifier corresponding to the user and the request content in the service request to the AI server through any of the aforementioned one or more service session channel.

For each user requesting a service, only one user session channel is established between the user and the proxy server, and the proxy server assigns a unique session identifier to the user session channel. When a user needs to use the services of the AI server, the user establishes a user session channel with the proxy server by using a mobile phone, a computer, or other terminals of the user, and sends a service request to the proxy server through this user session channel. The service request carries at least the user's service credentials and request content.

The request content is the descriptive information of the service that the user requires. Service credentials are obtained by the user upon registration with the registration and authentication server. The registration and authentication server, proxy server, and AI server can be different hardware devices, different server clusters, or different service programs deployed on the same hardware device. Service credentials include user identity information and service permission information. The user identity information uniquely identifies the user and can be a user account. Service permission information can include one or more of the traffic required for service use, the number of services that can be used, the duration of service use, and the content of services that can be accessed.

After receiving the service request, the proxy server parses the user's service credentials and request content from the service request, sends the service credentials to the registration and authentication server, which authenticates the user based on these credentials and returns the authentication result to the proxy server. The proxy server receives the authentication result. If the authentication result indicates that the user has failed the authentication, the proxy server discards the service request. If the authentication is successful, the proxy server sends the session identifier corresponding to the user and the request content to the AI server.

In other embodiments of this disclosure, registration and authentication of the user may also be performed by a proxy server. In this case, the user's service credentials are issued by the proxy server. After receiving the service request, the proxy server authenticates the service credentials in the service request. If the authentication is successful, the proxy server sends the session identifier corresponding to the user and the request content to the AI server.

In response to a determination that there is only one service session channel between the proxy server and the AI server, the proxy server sends the session identifier and request content corresponding to the user to the AI server through this channel. In this scenario, information related to the user's identity is not sent to the AI server. Instead, session identifiers are used to distinguish the request content and a request result of each user, ensuring that the AI server cannot know which specific user the request content and request results belong to. Furthermore, with only one service session channel, all user requests and results are transmitted through the same channel. Even if the AI server analyzes user profiles based on the data transmitted through this channel, the resulting profiles will not match any specific user, thereby protecting user privacy and enhancing data security while providing generative AI services.

In response to a determination that there are multiple service session channels between the proxy server and the AI server, for each authenticated service request, the proxy server can randomly transmit the session identifier and request content corresponding to that service request through any one of the multiple service session channels to the AI server. In doing so, on the one hand, information related to user identities is not sent to the AI server, and session identifiers are used to distinguish between individual users, such that the AI server cannot know which specific user the request content and request results belong to. On the other hand, the data transmitted through each service session channel is a mixture of data from multiple different users. Even if the AI server analyzes user profiles based on the data transmitted through a service session channel, the resulting user profiles will not match any specific user, thereby protecting user privacy and enhancing data security while providing generative AI services.

In some embodiments of this disclosure, in response to a determination that multiple service session channels are established between the proxy server and the AI server, the proxy server can also be used to transmit the request contents of multiple service requests from the same user to the AI server through different service session channels respectively. Of course, when the request content of each service request is transmitted, the session identifier corresponding to the user is also transmitted synchronously, i.e., the session identifier is associated with the request content and sent to the AI server together.

By distributing the request contents of multiple service requests from the same user through multiple service session channels for transmission in this manner, it avoids transmitting all service requests from the same user through a single service session channel, ensuring that each service session channel carries data mixed with data from different users. In this way, the AI server cannot analyze the personality, event opinions, or other privacy information of specific users based on the data transmitted through any single service session channel, thereby achieving the protection of user privacy.

In other embodiments of this disclosure, the proxy server is also used to classify the request contents in the received service requests; for each category, the request contents belonging to the category are sent to the AI server through different service session channels separately.

In some implementations, the proxy server can classify the request content based on the semantics of the request content, which can include but is not limited to work, life, study, and other categories. Specifically, the proxy server can perform text processing on the request content to identify the category to which the request content belongs to.

The proxy server can pre-configure a semantic feature library or a keyword feature library for each category. The proxy server identifies the semantic features of the request content through text processing, then matches these semantic features with those in the semantic feature libraries corresponding to various categories, and determines the category corresponding to the semantic feature library with the highest matching degree as the category to which the request content belongs. Alternatively, the proxy server performs word segmentation on the request content to obtain multiple words included in the request content. It then queries the number of words in the request content that are included in the keyword libraries corresponding to each category, and determines the category corresponding to the keyword library with the largest number of words as the category to which the request content belongs.

In another implementation, the request content can also be classified based on the IP address of the source of the service request. The proxy server can analyze the location area of the source of the service request based on the IP address and classify the request content based on the location area. For example, the request content can be divided into those from City A, City B, or City C.

The methods for classifying request content are not limited to the above two implementations, and any method that can divide request content into multiple categories falls within the scope of this disclosure.

After classifying the request content of service requests using any method and determining the category of the request content, different request contents within the same category are transmitted to the AI server through different service session channels separately. Of course, the corresponding session identifier is also transmitted when the request content is transmitted.

Users belonging to the same group tend to have similar request contents when using AI servers, for example, teachers and students in schools often have requests related to learning, while medical staff and patients in hospitals have requests more related to healthcare. In relevant technologies, AI servers can create user personas for a group based on data from users within the group, which can lead to the leakage of important group information. However, in the above embodiments of this disclosure, by distributing request contents of the same category across different service session channels for transmission, each service session channel transmits a relatively even proportion of request contents from various categories, and no user identity-related information is transmitted to the AI server. Therefore, the AI server cannot determine the specific user corresponding to each request content. Even if the AI server analyzes data transmitted through the same service session channel, it cannot create a user persona that matches a specific user or group, thereby protecting both individual privacy and group/organization privacy, further enhancing the security of user data when using AI services.

This disclosure refers to the method of transmitting request contents from the proxy server to the AI server in the above embodiments as adopting a confusion mechanism. By confusing the requests of different users in terms of sequence and/or content through a proxy server to eliminate the relevance of service content context, the AI server cannot analyze the contextual connections between user requests based on the received content. Consequently, the AI server cannot extract personal information such as privacy, personality, occupation, emotions, event opinions, and tendencies. Similarly, it cannot extract sensitive information for corporate or group.

Figure 2:
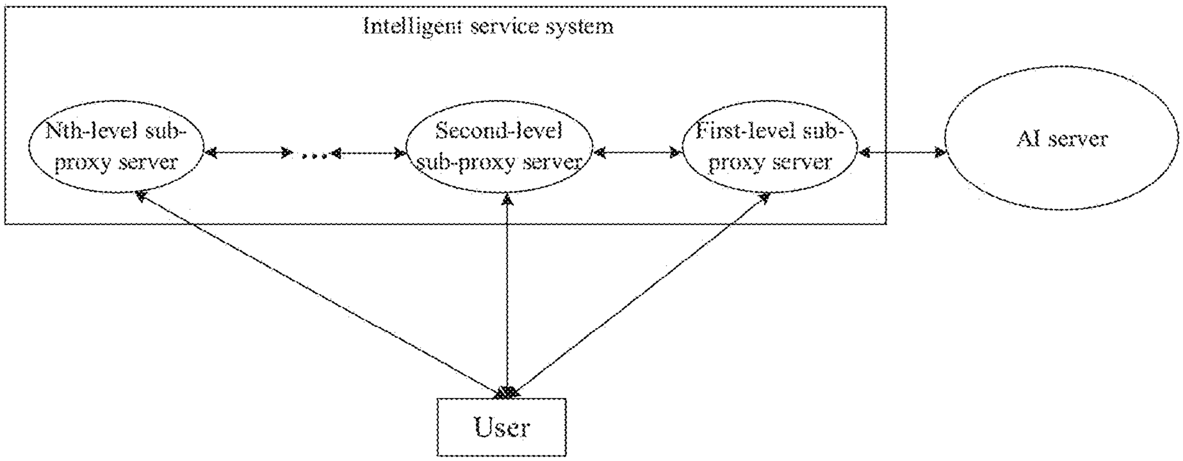
FIG. 2 shows another structural diagram of an intelligent service system provided in an example of the present disclosure.

In some other embodiments of the present disclosure, the above-mentioned proxy server may include a plurality of levels of sequentially connected sub-proxy servers. As shown in FIG. 2, the first-level, second-level, and Nth-level sub-proxy servers are schematically drawn, connected sequentially from the Nth-level sub-proxy server to the first-level sub-proxy server.

As shown in FIG. 2, each level of sub-proxy server can directly connect with the user for communication. Each level of sub-proxy server can be connected with the adjacent level of sub-proxy server for communication, which includes the adjacent upper-level and/or the adjacent lower-level of sub-proxy server. At least one proxy session channel is established between the sub-proxy servers at each level and the adjacent sub-proxy servers.

Each sub-proxy server is to receive service requests from users. Upon successful user authentication, it acquires the user's session identifier and the content of the service request; or it receives the session identifier and corresponding request content from the adjacent upper-level of sub-proxy server; and to send the session identifier and corresponding request content to the lower-level node through any session channel in the session channels between the lower-level node and the sub-proxy server, which includes the lower-level sub-proxy server adjacent to the current-level sub-proxy server or the AI server connected to the current-level sub-proxy server.

In the intelligent service system, a plurality of levels of sub-proxy servers are deployed, and each level of sub-proxy server can adopt the method provided in any of the above embodiments to scramble and transmit the request contents of different users to the lower-level node.

Specifically, the first-level sub-proxy server can directly register and purchase services from the AI server. It can then distribute these services through the registration and authentication server, offering content confusion mechanisms or algorithms as a value-added service to users. The second-level sub-proxy server purchases services from the first-level sub-proxy server via the registration and authentication server, again distributing these services while providing content confusion mechanisms or algorithms as a value-added service. This pattern can be extended to include third-level, fourth-level sub-proxy servers, each level of sub-proxy server independently adding content confusion services. End users can choose different levels of sub-proxy servers for content obfuscation services based on their own privacy protection needs. The more levels there are, the more times the content will be obfuscated, making it more difficult to trace back the final service content. Users can also further enhance the degree of content obfuscation by purchasing services from multiple sub-proxy servers and randomly assigning service requests to one of them.

As the number of sub-proxy server nodes increases, the request contents from different users are mixed more thoroughly, making it even more difficult for the AI server to trace or analyze the privacy information of the users based on the received data, thereby further enhancing the protection of user privacy in generative AI services.

Figure 3:
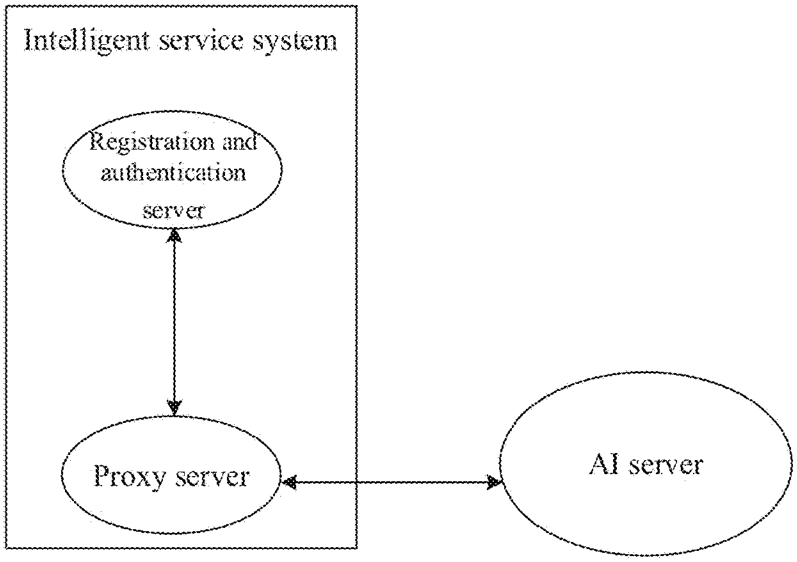
FIG. 3 shows another structural diagram of an intelligent service system provided in an example of the present disclosure.

In some other embodiments of the present disclosure, as shown in FIG. 3, the intelligent service system further includes a registration and authentication server. The registration and authentication server can communicate with users as well as with the proxy server. In cases where the intelligent service system includes a plurality of levels of sub-proxy servers, the registration and authentication server can communicate with sub-proxy servers at all levels.

Registration and Authentication Server: it is to receive user registration requests from users and issuing service credentials to users based on these requests. Upon receiving a service request from a user via the proxy server, it authenticates the user based on the service credentials provided and returns the authentication result to the proxy server.

Proxy Server: it is to receive service requests from users requesting services, and send the service credentials carried in the service requests to the registration and authentication server; receive the authentication results returned by the registration and authentication server; and determine whether the user has passed authentication based on the authentication results.

Figure 4:
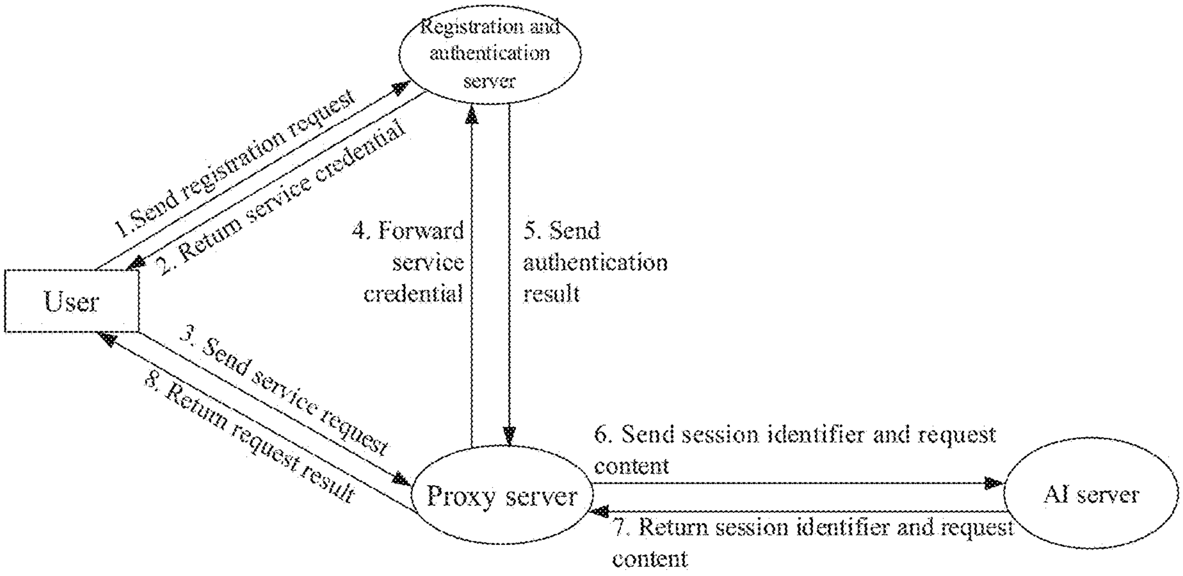
FIG. 4 shows a schematic diagram of providing users with AI services based on the structure of the intelligent service system shown in FIG. 3.

The aforementioned user registration request includes user identity information such as user account, device identifier, IP address, and information related to the purchased services. As shown in FIG. 4, upon receiving a user registration request, the registration and authentication server generates a service credential for the user, sends it to the user, and stores it locally. Wherein, the service credential includes user identity identifiers, service permission information and other information.

Users receive and store their own service credential. When they need to access services provided by the AI server, they send a service request to the proxy server, which includes the user's service credentials and request content. Upon receiving this service request, the proxy server forwards the user's service credentials to the registration and authentication server. The registration and authentication server receives the service credentials sent by the proxy server and, based on the user identity identifier included in these credentials, retrieves the corresponding service credentials for that user identity identifier from all the service credentials stored locally. It then compares the locally retrieved service credentials with the service credentials sent by the proxy server. If they match, it sends an authentication result indicating that the user has passed authentication to the proxy server. If they do not match, it sends an authentication result indicating that the user has failed authentication to the proxy server.

Upon receiving the authentication result from the registration and authentication server, the proxy server discards the user's service request if it determines that the authentication result indicates that the user has failed authentication. If it determines that the authentication result indicates that the user has passed authentication, it identifies the session identifier of the user session channel connected to the user and retrieves the request content from the user's service request. It then sends the user's session identifier and request content to the AI server. The AI server generates a request result based on the request content and returns the user's session identifier and request result to the proxy server. The proxy server then returns the request result to the user based on the session identifier. The entire registration-authentication-service process is illustrated in FIG. 4.

By implementing independent and decentralized authority management among the registration and authentication server, proxy server, and AI server, the registration and authentication server is responsible for user registration and authentication, with all user identity-related information stored within the registration and authentication server. This separation of identity registration and authentication from AI content services ensures that access control for service content is managed through the proxy server and AI server, decoupling service content from user identities. The AI server can only access request content without user identity information, preventing correlation analysis between service content and specific user identities. Consequently, it cannot create user profiles based on historical data analysis, enhancing user privacy security.

In the embodiment where the registration and authentication server performs user registration and authentication, the proxy server subscribes to services from the AI server and provides the subscribed services to users through the registration and authentication server. Specifically, the proxy server sends a service subscription request to the AI server and receives service authorization information from the AI server. Afterwards, the proxy server sends a proxy registration request to the registration and authentication server, which carries information such as the proxy server's device identifier and IP address. It then receives a registration response from the registration and authentication server. In this way, after subscribing to services from the AI server and registering with the registration and authentication server, the proxy server can provide the subscribed services to users registered with that registration and authentication server.

The service credentials carried in the service request received by the proxy server include identification information of the registration and authentication server that issued the service credentials. This identification information can be the device identifier or IP address of the registration and authentication server. If the proxy server determines that this identification information matches the identification information of the registration and authentication server it is registered with, it processes the service request according to the methods provided in the above embodiments. If the proxy server determines that the identification information does not match the identification information of the registration and authentication server it is registered with, it discards the service request or instructs the user to send the service request to the proxy server corresponding to the identification information. Additionally, the proxy server can also register with the registration and authentication server corresponding to the identification information. If the registration is successful, it can then provide service for the service request, i.e., process the service request according to the methods provided in the above embodiments.

In other embodiments of this disclosure, the intelligent service system can include multiple registration and authentication servers, and the aforementioned proxy server can register with one or more of these registration and authentication servers. The proxy server can also autonomously choose an appropriate registration and authentication server to register and sell services. This creates a competitive mechanism between proxy servers from the same vendor and registration and authentication servers from different vendors, ensuring that the entire ecosystem continuously enhances and improves its services independently, focusing on improving user service quality and privacy protection.

In deployment scenarios involving a plurality of levels of sub-proxy servers connected sequentially, each sub-proxy server can send a service subscription request to the adjacent lower-level node and receive service authorization information from the lower-level node. The adjacent lower-level node includes either the lower-level sub-proxy server adjacent to the current level sub-proxy server or the AI server connected to the current level sub-proxy server.

After subscribing to services from the adjacent lower-level sub-proxy server or the AI server, the sub-proxy server can send a proxy registration request to at least one of the multiple registration and authentication servers and receive registration response information from that at least one registration and authentication server. Afterwards, the sub-proxy server can provide the subscribed services to users registered with that at least one registration and authentication server in accordance with the methods provided in any of the above embodiments.

Figure 5:
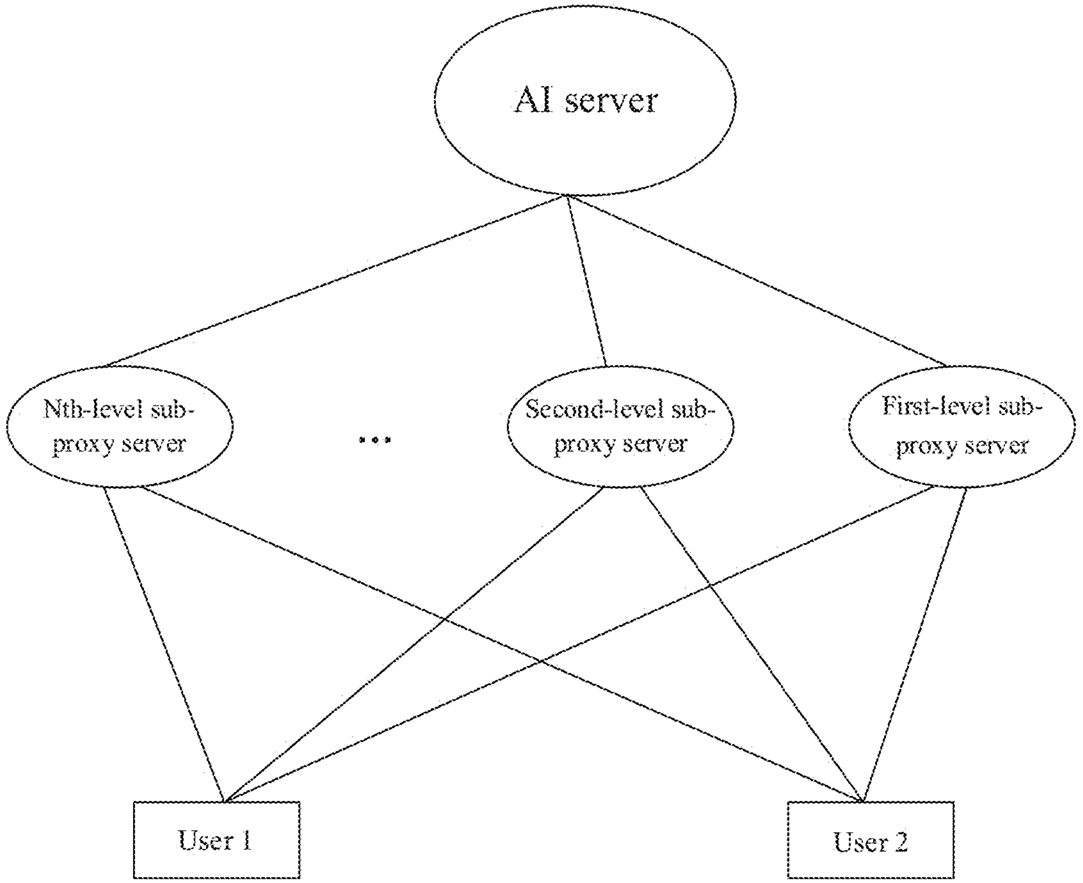
FIG. 5 shows a diagram where users can autonomously select a proxy server in an example of the present disclosure.
Figure 6:
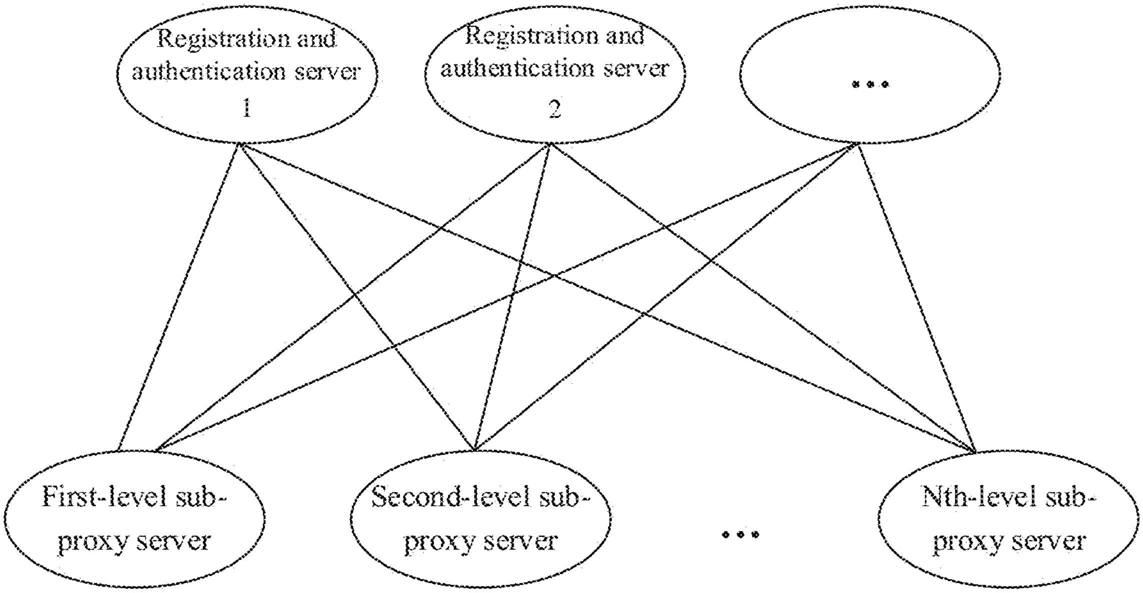
FIG. 6 shows a diagram where proxy services can autonomously select a registration and authentication server in an exemplary embodiment of the present disclosure.

Through the embodiments of this disclosure, users with privacy protection needs do not directly register for services on the AI server but instead register their user information and purchase service content from the registration and authentication server. The registration and authentication server issues corresponding service credentials to users, which can include metering and billing details such as usage traffic, usage frequency, and user identity. When consuming services, users present their credentials to the proxy server to request services. The proxy server authenticates the user with the registration and authentication server, which returns the authentication result to the proxy server. Based on the authentication result, the proxy server provides content obfuscation and AI services, completing user metering and billing in the process and synchronizing billing results with the registration and authentication server to deduct user account fees and resources. Users can autonomously choose a suitable proxy server to access AI services based on their privacy protection needs and service proxy quality, as shown in FIG. 5, where users can select which proxy server to send service requests through. Users can also choose a suitable registration and authentication server to purchase and consume content obfuscation and AI services provided by various sub-proxy servers. Similarly, proxy servers can choose a suitable registration and authentication server for registration and service sales, as depicted in FIG. 6. This creates a competitive mechanism between proxy servers from the same vendor and registration and authentication servers from different vendors, ensuring that the entire ecosystem continuously improves and enhances its services independently, focusing on enhancing user service quality and privacy protection.

In the embodiments of this disclosure, the proxy server obfuscates the request content of different users sequentially and/or in content, preventing the AI server from obtaining the contextual relevance of service content and making it difficult to analyze user profiles based on request content, thereby enhancing the security of user privacy data. This embodiment also provides a system architecture with multi-level sub-proxy servers, allowing users to select different levels of service proxies for privacy obfuscation based on their data protection needs, preventing generative AI content service providers from extracting user privacy, personality, occupation, emotions, event opinions, tendencies, and sensitive information about groups or organizations based on the contextual relevance of service content.

Furthermore, the embodiments separate identity registration and authentication from generative AI content services. Users with privacy protection needs can register and authenticate through the registration and authentication server and access service content through the proxy server, decoupling service content from user identities. This prevents generative AI content service providers from obtaining users' real information and associating service content with specific user identity.

Proxy servers, AI servers, and registration and authentication servers can independently choose suitable platforms to provide services, introducing a competitive mechanism that encourages all parties to compete independently around user business experience and privacy protection, continuously improving and enhancing their services.

Figure 7:
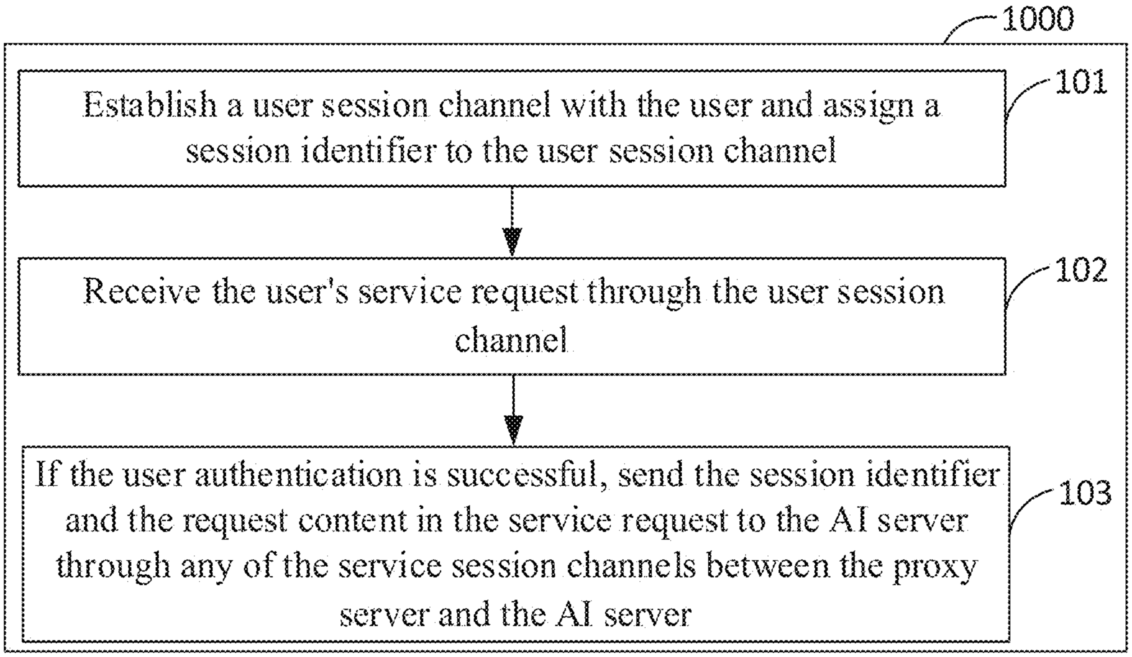
FIG. 7 shows a schematic diagram of an intelligent service method provided in an exemplary embodiment of the present disclosure.

Some embodiments of the present disclosure further provide an intelligent service method applicable to the proxy server in the intelligent service system provided by any of the aforementioned embodiments, as shown in FIG. 7. The method 1000 includes the following steps:

At step 101, a user session channel with the user is established and a session identifier is assigned to the user session channel.

The session identifier is to uniquely identify the user session channel.

At step 102, the user's service request is received through the user session channel.

The service request carries the user's service credentials and request content.

At step 103: If the user authentication is successful, the session identifier and the request content in the service request are sent to the AI server through any of the service session channels between the proxy server and the AI server.

For each authenticated service request, the proxy server can randomly transmit the session identifier and request content corresponding to that service request through any one of the multiple service session channels to the AI server. In doing so, on the one hand, information related to user identities is not sent to the AI server, and session identifiers are used to distinguish between individual users, such that the AI server cannot know which specific user the request content and request results belong to. On the other hand, the data transmitted through each service session channel is a mixture of data from multiple different users. Even if the AI server analyzes user profiles based on the data transmitted through a service session channel, the resulting user profiles will not match any specific user, thereby protecting user privacy and enhancing data security while providing generative AI services.

In scenarios where multiple service session channels are established between the proxy server and the AI server, for multiple service requests from the same user, the proxy server can send the session identifier and request content of each service request to the AI server through different service session channels between the proxy server and the AI server.

By distributing the request contents of multiple service requests from the same user across multiple service session channels for transmission as described above, it avoids transmitting all service requests from the same user through a single service session channel, ensuring that each service session channel transmits mixed data from different users. In this way, the AI server cannot analyze specific user privacy such as personality, event opinions, etc., based on the data transmitted through any single service session channel, thereby achieving the protection of user privacy.

Since users belonging to the same group tend to have similar request contents when using AI servers, for example, teachers and students in schools are more likely to have requests related to learning, while medical staff and patients in hospitals are more likely to have requests related to healthcare. In related technologies, the AI server can portray user profiles of a group based on the data of users belonging to that group, which can also lead to the leakage of important group information. Based on this, in other embodiments of the present disclosure, the proxy server can further categorize the request contents in the service requests; for request contents belonging to the same category from different service requests, they are sent to the AI server through different service session channels between the proxy server and the AI server.

The specific method of categorizing request contents has been detailed in the embodiments of the aforementioned intelligent service system and will not be repeated here. By distributing request contents of the same category across different service session channels for transmission, each service session channel transmits a relatively even proportion of request contents from various categories, without transmitting user identity-related information to the AI server. Therefore, the AI server cannot determine the specific user corresponding to each request content. Even if the AI server analyzes the data transmitted through a single service session channel, it cannot portray a user profile that matches a specific user or group, thereby protecting both individual privacy and group/organization privacy, further enhancing the security of user data in AI services.

The present disclosure refers to the manner in which the proxy server transmits request contents to the AI server in the above embodiments as employing a confusion mechanism. Through the proxy server, the request contents of different users are confused in order and/or content, thereby removing the contextual relevance of service content, making it impossible for the AI server to analyze the correlations between the user's contexts in service content based on the received request contents, and further impossible to extract personal information such as privacy, personality, occupation, emotions, event opinions, and tendencies. For enterprise or group users, sensitive information cannot be extracted as well.

In other embodiments of the present disclosure, the proxy server includes a plurality of levels of sub-proxy servers connected in sequence, as shown in FIG. 2. In the system architecture scenario with multi-level sub-proxy servers, the current-level sub-proxy server sends the session identifier and corresponding request content from the previous-level node to the lower-level node through any session channel among the session channels between the current-level and next-level nodes; the previous-level node includes the user or the adjacent upper-level sub-proxy server of the current-level sub-proxy server; the next-level node includes the adjacent lower-level sub-proxy server of the current-level sub-proxy server or the AI server connected to the current-level sub-proxy server.

In some embodiments of the present disclosure, each level of sub-proxy server can employ any of the methods provided in the above embodiments to confuse and scramble the request contents of different users before transmitting them to the next-level node. Thus, the more levels of sub-proxy server nodes are passed through, the more thoroughly the request contents of different users are confused, making it even more difficult for the AI server to trace or analyze the privacy of the user to whom the request content belongs based on the received data, further enhancing the protection of user privacy in generative AI services.

In some embodiments of the present disclosure, before sending the session identifier and corresponding request content from the previous-level node to the next-level node through any session channel between the next-level nodes, the current-level sub-proxy server sends a service subscription request to the adjacent next-level node and receives service authorization information returned by the next-level node. The current-level sub-proxy server sends a proxy registration request to at least one registration and authentication server and receives registration response information returned by the at least one registration and authentication server. After that, the current-level sub-proxy server can provide services subscribed by users registered on the at least one registration and authentication server in the manner of the above embodiments.

In some embodiments of the present disclosure, after receiving a service request from a user, the proxy server sends the user's service credentials carried in the service request to the registration and authentication server; receives the authentication result returned by the registration and authentication server based on the service credentials; and determines whether the user has passed the authentication based on the authentication result. After confirming the successful authentication, the user's session identifier and request content are sent to the AI server following the content obfuscation mechanism provided in the above embodiments. The AI server generates a request result based on the request content and returns the session identifier and request result to the proxy server. The proxy server receives the session identifier and corresponding request result returned by the AI server and returns the request result to the user through the user's session channel corresponding to the session identifier.

The operations performed by the proxy server and their corresponding technical effects in the embodiments of the present disclosure can refer to the operations and achieved effects of the proxy server in the intelligent service system provided in the above embodiments.

The intelligent service method provided in the embodiments of the present disclosure is based on the same inventive concept as the intelligent service system provided in the embodiments of the present disclosure, and has the same beneficial effects as the methods used, operated, or implemented therein.

Figure 8:
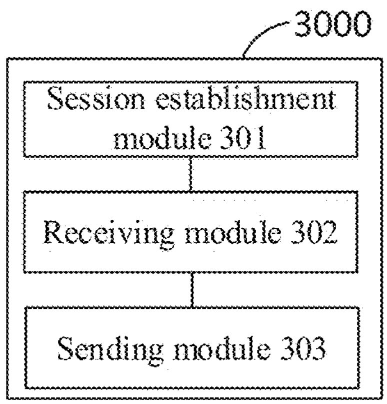
FIG. 8 shows a structural diagram of an intelligent service device provided in an exemplary embodiment of the present disclosure.

The embodiments of the present disclosure further provide an intelligent service device, which is applied to the proxy server in any of the above embodiments. As shown in FIG. 8, the device 3000 includes:

- a session establishment module 301, used for establishing a user session channel with the user and assigning a session identifier to the user session channel;
- a receiving module 302, used for receiving the user's service request through the user session channel; and
- a sending module 303, used for sending the session identifier and the request content in the service request to the AI server through any service session channel between the AI server and the proxy server, if the user is determined to have passed the authentication.

The sending module 303 is also used for, in case of multiple service requests from the same user, sending the session identifier of the same user and the request content of each service request to the AI server through different service session channels between the AI server and the proxy server.

The sending module 303 is further used for categorizing the request content in the service request; and for sending the request content of different service requests belonging to the same category to the AI server through different service session channels between the AI server and the proxy server.

In some embodiments, the proxy server includes a plurality of levels of sub-proxy servers connected in sequence; the sending module 303 is also used for sending the session identifier and corresponding request content from the previous-level node to the next-level node through any session channel between the next-level nodes; the previous-level node includes the user or the previous-level sub-proxy server adjacent to the current-level sub-proxy server; the next-level node includes the next-level sub-proxy server adjacent to the current-level sub-proxy server or the AI server connected to the current-level sub-proxy server.

The sending module 303 is also used for sending a service subscription request to the adjacent next-level node; the receiving module 302 is further used for receiving service authorization information returned by the next-level node; the sending module 303 is also used for sending a proxy registration request to at least one registration and authentication server; and the receiving module 302 is further used for receiving registration response information returned by the at least one registration and authentication server.

The device further includes: an authentication module for sending the user's service credential, which is carried in the service request, to the registration and authentication server; receiving the authentication result returned by the registration and authentication server based on the service credential; and determining whether the user has passed the authentication based on the authentication result.

The receiving module 302 is also used for receiving the session identifier and corresponding request results returned by the AI server. The sending module 303 is also used for returning the request results to the user via the user session channel corresponding to the session identifier.

The intelligent service device provided in the embodiments of the present disclosure is based on the same inventive concept as the intelligent service method provided in the embodiments of the present disclosure and has the same beneficial effects as the method being adopted, operated, or implemented.

Figure 9:
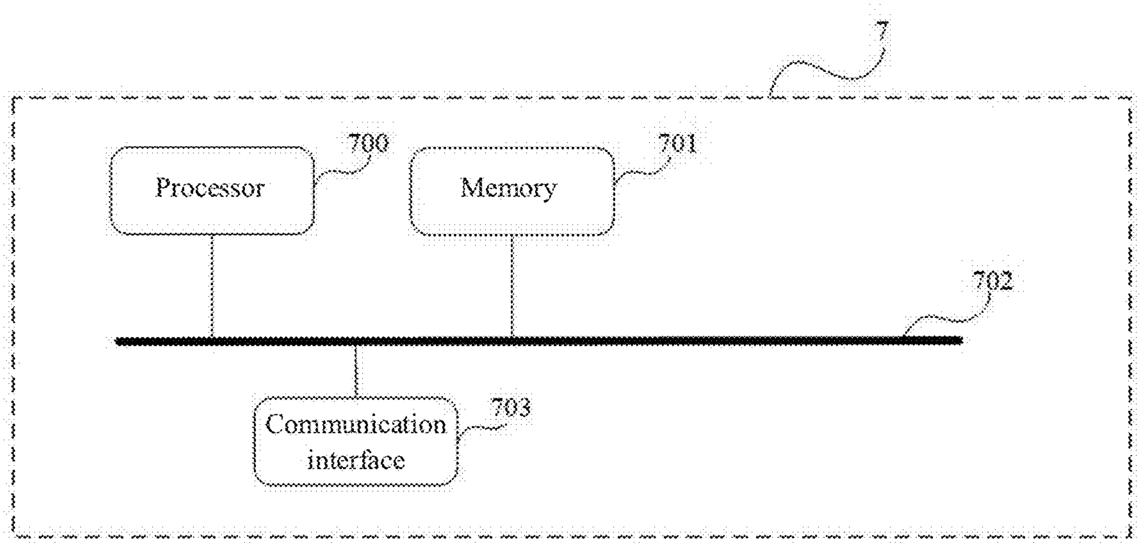
FIG. 9 shows a structural diagram of an electronic device provided in an exemplary embodiment of the present disclosure.

Reference is made below to FIG. 9, which illustrates a schematic diagram of an electronic device provided by some embodiments of the present disclosure. As shown in FIG. 9, the electronic device 7 comprises: a processor 700, a memory 701, a bus 707 and a communication interface 703, the processor 700, the communication interface 703 and the memory 701 being connected via the bus 707; the memory 701 having stored therein a computer program that can be run on the processor 700, and the processor 700 executing, when running the computer program, the present intelligent service method provided by any of the preceding embodiments of the disclosure.

Wherein the memory 701 may comprise a high-speed random access memory (RAM: Random Access Memory) or may also comprise a non-volatile memory, such as at least one disk memory. A communication connection between this system network element and at least one other network element is achieved via at least one communication interface 703 (which may be wired or wireless), which may use the Internet, a wide area network (WAN), a local network (LAN), a metropolitan area network (MAN), and the like.

The bus 707 may be an ISA bus, a PCI bus or an EISA bus, etc. The bus may be classified as an address bus, a data bus, a control bus, and the like. Wherein the memory 701 is used to store a program, the processor 700 executes the program after receiving an execution instruction, and the intelligent service method disclosed in any of the foregoing embodiments of the present disclosure may be applied in or implemented by the processor 700.

The processor 700 may be an integrated circuit chip with signal processing capabilities. In the implementation, the steps of the method described above may be accomplished by integrated logic circuits of hardware in the processor 700 or by instructions in the form of software. The above-described processor 700 may be a general-purpose processor, including a central processing unit (Central Processing Unit, or CPU), a network processor (Network Processor, or NP), and the like; it may also be a digital signal processor (DSP), a special-purpose integrated circuit (ASIC), an off-the-shelf programmable gate array (FPGA) or other programmable logic devices, discrete gate or transistor logic devices, and discrete hardware components. Various methods, steps, and logic block diagrams of the disclosure in embodiments of the present disclosure may be implemented or performed. The general purpose processor may be a microprocessor or the processor may also be any conventional processor, etc. The steps of the methods disclosed in conjunction with embodiments of the present disclosure may be directly embodied as being performed by a hardware decoding processor or performed with a combination of hardware and software modules in the decoding processor. The software module may be located in a random memory, flash memory, read-only memory, programmable read-only memory or electrically erasable programmable memory, registers, and other storage media well established in the art. The storage medium is located in the memory 701, and the processor 700 reads the information in the memory 701 and completes the steps of the above method in combination with its hardware.

The electronic device provided by the embodiments of the present disclosure is motivated by the same idea as the smart service method provided by the embodiments of the present disclosure, and has the same beneficial effect as the method adopted, operated or implemented thereof.

Figure 10:
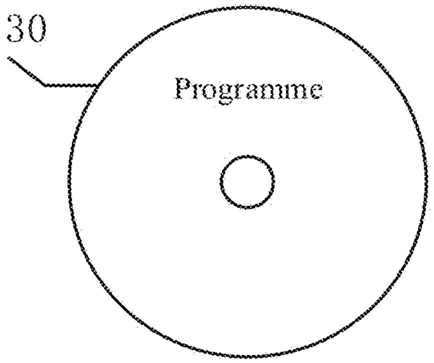
FIG. 10 shows a diagram of a storage medium provided in an exemplary embodiment of the present disclosure.

Embodiments of the present disclosure also provide a computer-readable storage medium corresponding to the intelligent service method provided by the preceding embodiments, referring to FIG. 10, which illustrates a computer-readable storage medium as a compact disc 30 on which a computer program (i.e., a program product) is stored, the computer program, when run by a processor, executes the intelligent service method provided by any of the preceding embodiments.

Further, examples of the computer-readable storage medium may also include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory, or other optical magnetic storage media, which will not be described herein.

The computer-readable storage media provided by the above embodiments of the present disclosure and the intelligent service method provided by the embodiments of the present disclosure are based on the same concept, and have the same beneficial effect as the method adopted, operated or implemented by the application stored therein.

It should be noted that the algorithms and displays provided herein are not inherently related to any specific computer, virtual device, or other equipment. Various general-purpose devices can also be used in conjunction with the teachings presented herein. Based on the above description, the structure required to construct such devices is self-evident. Furthermore, this disclosure is not directed at any specific programming language. It should be understood that the content of this disclosure described herein can be implemented using various programming languages, and the description of a specific language above is intended to disclose the best mode of carrying out this disclosure.

Similarly, it should be appreciated that, to streamline this disclosure and aid in understanding one or more of its various aspects, the various features of this disclosure are sometimes grouped together in a single embodiment, figure, or description of them. However, this disclosure should not be interpreted as reflecting an intention that the claimed subject matter requires more features than are expressly recited in each claim. Rather, as reflected in the claims below, inventive aspects lie in less than all features of a single disclosed embodiment. Thus, the claims following the detailed description are hereby expressly incorporated into this detailed description, with each claim standing as a separate embodiment of this disclosure.

The various component embodiments of this disclosure can be implemented in hardware, as software modules running on one or more processors, or as a combination of both. Those skilled in the art will appreciate that microprocessors or digital signal processors (DSPs) can be used in practice to implement some or all of the functions of some or all of the components of the virtual machine creation device according to the embodiments of this disclosure. This disclosure can also be implemented as a device or apparatus program for executing part or all of the methods described herein. The program implementing this disclosure can be stored on a computer-readable medium or can be in the form of one or more signals. Such signals can be downloaded from an Internet website, provided on a carrier signal, or provided in any other form.

The above is merely a preferred embodiment of this disclosure, but the scope of protection of this disclosure is not limited to this. Any changes or replacements that can be easily conceived by any person skilled in the art within the technical scope disclosed in this disclosure should be covered within the scope of protection of this disclosure. Therefore, the scope of protection of this disclosure should be based on the scope of protection of the claims described.

What is claimed is:

1. An intelligent service system, comprising: a proxy server comprising a memory and a processor, wherein the proxy server has a user session channel established between the proxy server and a user requesting a service, and assigns a session identifier to the user session channel;

the proxy server has one or more service session channels established between the proxy server and an external artificial intelligence (AI) server; and the proxy server is to receive a service request from the user through the user session channel, in response to a determination that a user authentication passes, the session identifier corresponding to the user and a request content in the service request are sent to the AI server through any of the one or more service session channels, wherein the proxy server comprises a plurality of levels of sub-proxy servers connected in sequence, with one or more proxy session channel established between any adjacent sub-proxy servers, wherein for each of the plurality of levels of sub-proxy servers, the sub-proxy server is to receive the service request from the user, upon successful user authentication, the sub-proxy server receives the session identifier of the user and corresponding request content from an adjacent upper-level sub-proxy server, and the sub-proxy server sends the session identifier of the user and the corresponding request content from the upper-level sub-proxy server to a lower-level node through any session channel in the one or more service session channels between the lower-level node and the sub-proxy server, and wherein the upper-level sub-proxy server is adjacent to a current-level sub-proxy server, and the lower-level node comprises a lower-level sub-proxy server adjacent to the AI server connected to the current-level sub-proxy server.

2. The intelligent service system according to claim 1, wherein the proxy server is to, for a plurality of service requests from a same user, send request contents of the plurality of service requests to the AI server through different service session channels respectively.

3. The intelligent service system according to claim 1, wherein the proxy server is to classify request contents in received service requests into categories, for each category, the request contents belonging to the category is sent to the AI server through different service session channels respectively.

4. The intelligent service system according to claim 1, further comprising a registration and authentication server, wherein the registration and authentication server is to: receive user registration requests from users and issuing service credentials to the users based on these user registration requests, and based on a service credential of a user requesting service sending by the proxy server, authenticate the user requesting service based on the service credentials provided and return the authentication result to the proxy server; and the proxy server is to: receive service requests from a user requesting service, and send the service credentials carried in the service requests to the registration and authentication server, receive an authentication result returned by the registration and authentication server, and determine whether a user has passed authentication based on the authentication result.

5. The intelligent service system according to claim 1, further comprising a plurality of registration and authentication servers, wherein each of the sub-proxy servers is to: send a service subscription request to an adjacent lower-level node, and receive service authorization information returned by the lower-level node, and send a proxy registration request to one or more of the plurality of registration and authentication servers, and receive registration response information returned by the one or more registration and authentication servers.

6. An intelligent service method, applied to a proxy server, comprising:

establishing a user session channel with a user requesting a service, and assigning a session identifier to the user session channel;

receiving a service request from the user through the user session channel; and sending the session identifier corresponding to the user and request content in the service request to an artificial intelligence (AI) server via any of one or more service session channels established between the proxy server and the AI server, in response to a determination that a user authentication is determined to have passed, wherein the proxy server comprises a plurality of levels of sub-proxy servers connected in sequence, with one or more proxy session channels established between any adjacent sub-proxy servers, wherein for each of the plurality of levels of sub-proxy servers, the sub-proxy server is to receive the service request from the user, upon successful user authentication, the sub-proxy server receives the session identifier of the user and corresponding request content from an adjacent upper-level sub-proxy server, wherein the method further comprises:

sending the session identifier of the user and the corresponding request content from the upper-level sub-proxy server to a lower-level node through any of the one or more session channels between the lower-level node and the sub-proxy server, and wherein the upper-level sub-proxy server is adjacent to a current-level sub-proxy server, and the lower-level node comprises a lower-level sub-proxy server adjacent to the AI server connected to the current-level sub-proxy server.

7. The method according to claim 6, wherein sending the session identifier and the request content in the service request to the AI server via any of the service session channels with the AI server comprises:

for a plurality of service requests from a same user, sending the session identifier of the same user and the request content in each of the plurality of service requests to the AI server through different service session channels with the AI server, respectively.

8. The method according to claim 6, wherein sending the session identifier and the request content in the service requests to the AI server via any of the service session channels with the AI server comprises:

classifying the request content in the service request; and sending request contents of different service requests belonging to a same category to the AI server through different service session channels with the AI server, respectively.

9. The method according to claim 7, wherein sending the session identifier and the corresponding request content from the upper-level node to the lower-level node through any of the session channels with the lower-level node before sending the session identifier and the corresponding request content to the lower-level node through any of the session channels with the lower-level node, further comprises:

sending a service subscription request to an adjacent the lower-level node, and receiving service authorization information returned by the lower-level node; and sending a proxy registration request to at least one registration and authentication server, and receiving registration response information returned by the at least one registration and authentication server.

10. The method according to claim 6, further comprising, after receiving the service request from the user:

sending service credentials of the user carried by the service request to a registration and authentication server;

receiving an authentication result returned by the registration and authentication server based on the service credentials; and determining, based on the authentication result, whether the user is successfully authenticated.

11. The method according to claim 6, further comprising:

receiving a session identifier and a corresponding request result returned by the AI server; and returning a request result to a user from a user session channel corresponding to the session identifier.

12. An electronic device, comprising: a proxy server comprising a memory, a processor and a computer program stored on the memory and runnable on the processor, wherein the processor runs the computer program to implement operations comprising:

establishing a user session channel with a user requesting a service, and assigning a session identifier to the user session channel;

receiving a service request from the user through the user session channel; and sending the session identifier corresponding to the user and request content in the service request to an artificial intelligence (AI) server via service session channels established between the proxy server and the AI server, in response to a determination that a user authentication is determined to have passed, wherein the proxy server comprises a plurality of levels of sub-proxy servers connected in sequence, with one or more proxy session channels established between any adjacent sub-proxy servers, wherein for each of the plurality of levels of sub-proxy servers, the sub-proxy server is to receive the service request from the user, upon successful user authentication, the sub-proxy server receives the session identifier of the user and corresponding request content from an adjacent upper-level sub-proxy server, wherein the operations further comprise:

sending the session identifier of the user and the corresponding request content from the upper-level sub-proxy server to a lower-level node through any of the service session channels between the lower-level node and the sub-proxy server, and wherein the upper-level sub-proxy server is adjacent to a current-level sub-proxy server, the lower-level node comprises a lower-level sub-proxy server adjacent to the AI server connected to the current level sub-proxy server.

13. The electronic device according to claim 12, wherein sending the session identifier and the request content in the service request to the AI server via any of the service session channels with the AI server comprises:

for a plurality of service requests from a same user, sending the session identifier of the same user and the request content in each of the plurality of service requests to the AI server through different service session channels with the AI server, respectively.

14. The electronic device according to claim 12, wherein sending the session identifier and the request content in the service requests to the AI server via any of the service session channels with the AI server comprises:

classifying the request content in the service request; and sending request contents of different service requests belonging to a same category to the AI server through different service session channels with the AI server, respectively.

15. The electronic device according to claim 12, wherein sending the session identifier and the corresponding request content from the upper-level node to the lower-level node through any of the session channels with the lower-level node before sending the session identifier and the corresponding request content to the lower-level node through any of the session channels with the lower-level node, further comprises:

sending a service subscription request to an adjacent the lower-level node, and receiving service authorization information returned by the lower-level node; and sending a proxy registration request to at least one registration and authentication server, and receiving registration response information returned by the at least one registration and authentication server.

16. The electronic device according to claim 12, wherein the operations further comprise, after receiving the service request from the user:

sending service credentials of the user carried by the service request to a registration and authentication server;

receiving an authentication result returned by the registration and authentication server based on the service credentials; and determining, based on the authentication result, whether the user is successfully authenticated.

* * * * *